Aug. 24, 1926.
W. E. HENRY
1,597,153
SPRING SUSPENSION SYSTEM FOR VEHICLES
Filed May 20, 1925
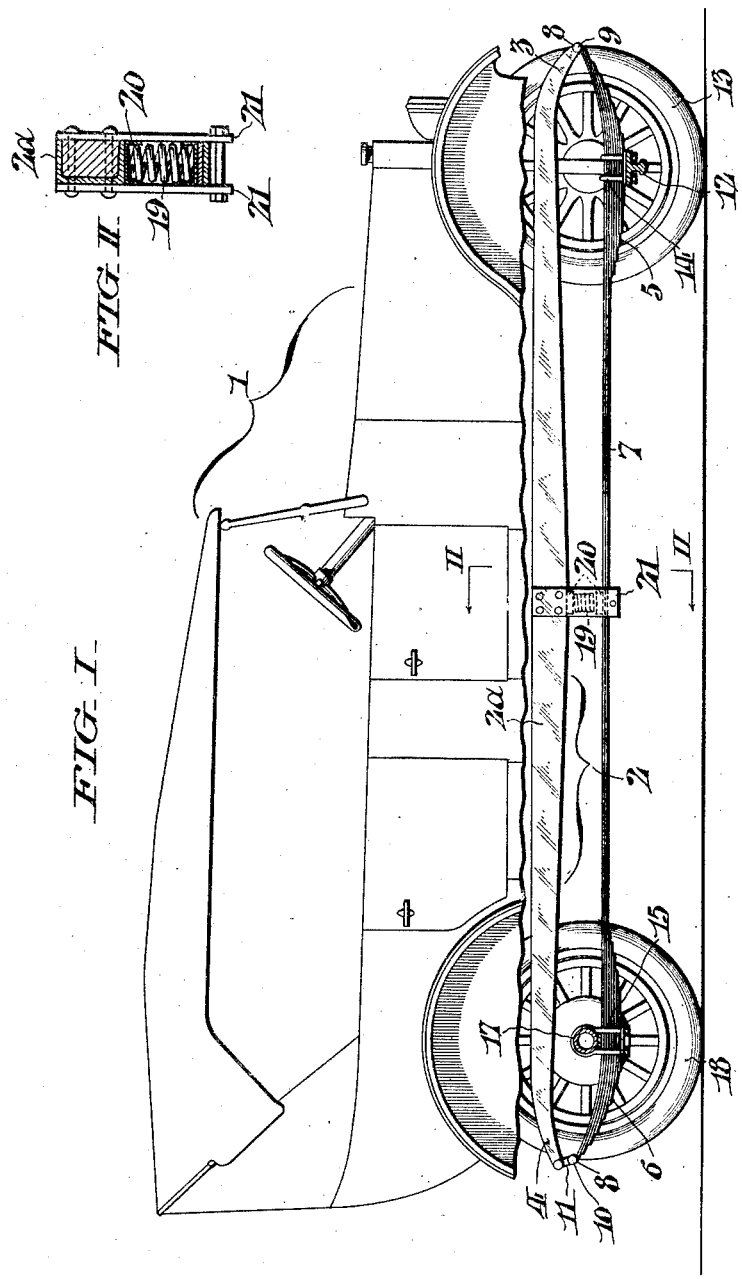
WITNESSES:
INVENTOR:
William E. Henry,
BY
ATTORNEYS.

Patented Aug. 24, 1926.

1,597,153

UNITED STATES PATENT OFFICE.

WILLIAM E. HENRY, OF TRENTON, NEW JERSEY.

SPRING SUSPENSION SYSTEM FOR VEHICLES.

Application filed May 20, 1925. Serial No. 31,566.

This invention relates to spring suspension systems for vehicles, more especially automobiles and the like; and is directed toward improving the riding qualities of such vehicles through efficient compensative absorption and distribution of the shocks encountered during travel.

One way in which this desideratum may be conveniently attained will become readily apparent from the detailed description hereinafter of the typical embodiment of this invention, shown in the drawings, whereof Fig. I is an illustration, more or less diagrammatic and partly in section, of an automobile equipped with my improved suspension system; and Fig. II is a detail sectional view on an enlarged scale taken as indicated by the arrows II—II in Fig. I.

The vehicle body indicated comprehensively at 1 may be of any standard design and construction, and mounted in the usual manner upon the chassis frame marked 2. As is customary, the ends of the sill rails 2ª of the chassis frame 2 are curved or bowed downwardly as at 3, 4 for convenience in attaching the spring suspension system, which, in this instance, comprises two sets of compound front and rear leaf spring sections 5, 6, respectively. In accordance with my invention, these spring sections 5, 6 are connected or joined in each instance, by several common auxiliary leaves 7 that are co-extensive in length with the chassis frame 2. The uppermost of the common auxiliary leaves 7 has its opposite ends fashioned to the form of loops or eyes 8 for pivotal attachment, on the one hand, to a pin 9 directly engaged in the forward extremity 3 of the corresponding sill rail 2ª of the chassis frame, and on the other hand, to a pin 10 carried by a shackle 11 which is in turn pivotally hung from the rear extremity 4 of said sill rail 2ª. The front axle 12 which carries the steering wheels 13, is clamped to the spring sections 5 in the usual manner by strap bolts shown at 14; and similar strap bolts 15 may likewise be employed in securing the rear springs 16 to the rear axle housing 17 wherein is journaled the divided shaft for the driving wheels 18. At one or more points intermediate the front and rear axles of the vehicle 1, I interpose between the common auxiliary leaves 7 of the spring suspension, and the chassis frame 2, yielding connection means preferably in the form of auxiliary helical compression or buffer springs 19, which, as shown, are maintained against disalignment by opposed cooperative cupped holders or washers 20, one of the latter being secured in each instance to the chassis frame rail 2ª, and the other to the uppermost of the leaves 7, in any convenient manner.

For the purpose of preventing displacement of the suspension system under lateral thrust during travel of the vehicle, I employ guides for the connecting spring leaves 7 constituted by depending plates 21 bolted or riveted to opposite sides of the sill rails 2ª of the chassis form 2, preferably at the regions of the auxiliary springs 19 as shown.

With my invention, it will be apparent that shocks received locally by anyone or group of the wheels 13, 18 are distributed uniformly and compensatively throughout the suspension system to the avoidance of excessive bounding or swaying of the vehicle body, the buffer springs 19 functioning incidentally to assist such distribution and at the same time to prevent undue flexure of the common connecting leaves 7 of the two sets; while the shackles 11 accommodate the linear expansion of the system, and the plates 21 function to prevent lateral displacement of the springs 19 relative to the chassis frame 2.

Having thus described my invention, I claim:—

1. A suspension system for vehicles comprising individual compound spring sections for the front and rear wheel axles of the vehicle, common leaves connecting said individual spring sections to distribute shocks incidental to travel for compensative absorption throughout the system, and yielding connections interposed between the supported vehicle body and the common connecting leaves at regions intermediate the said front and rear axles.

2. A suspension system for vehicles comprising individual compound spring sections for the front and rear wheel axles of the vehicle, common leaves connecting said individual spring sections to distribute shocks incidental to travel for compensative absorption throughout the system, and helical buffer springs interposed between the supported vehicle body and the common connecting leaves at regions intermediate said front and rear axles.

3. A suspension system for vehicles comprising individual compound spring sections for the front and rear axles of the vehicle, common leaves connecting said individual spring sections to distribute shocks incidental to travel for compensative absorption throughout the system, and means adapted to yieldingly accommodate linear movement as well as prevent lateral displacement of said common spring leaves relative to the vehicle body.

4. A suspension system for vehicles comprising individual compound spring sections for the front and rear axles of the vehicle, common leaves connecting said individual spring sections to distribute shocks incidental to travel for compensative absorption throughout the system, and guides depending from the vehicle body adapted to engage said common spring leaves with provision for linear movement and to prevent their displacement laterally.

5. A suspension system for vehicles comprising individual compound spring sections for the front and rear wheel axles of the vehicle, common leaves connecting said individual spring sections to distribute shocks incidental to travel for compensative absorption throughout the system, yielding connections interposed between the supported vehicle body and the common connecting leaves at regions intermediate the said front and rear axles, and means at each of the yielding connections to prevent lateral displacement of said common leaves relative to the vehicle body.

In testimony whereof, I have hereunto signed my name at Philadelphia, Pennsylvania, this 18th day of May, 1925.

WILLIAM E. HENRY.